Sept. 6, 1932.     C. STANSBURY ET AL     1,876,436
PHASE FAILURE AND PHASE REVERSAL PROTECTIVE SYSTEM
Filed Feb. 28, 1930      2 Sheets-Sheet 1
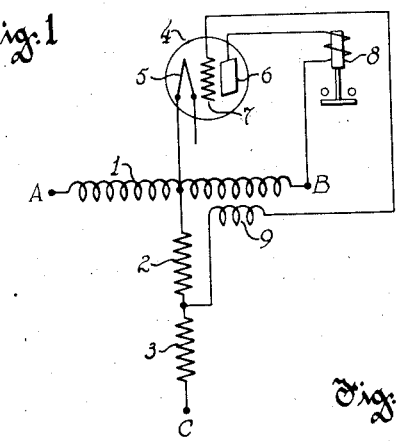
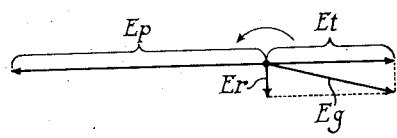
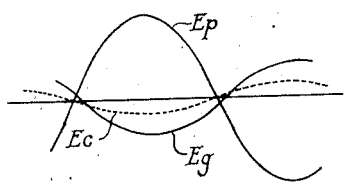
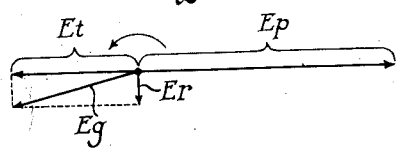
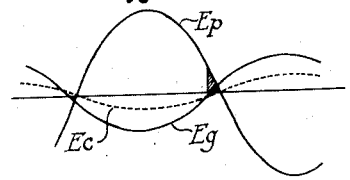
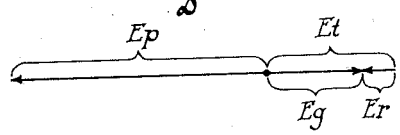
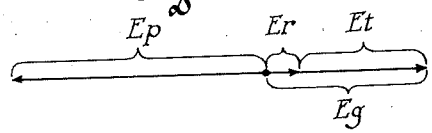
Inventors
Carroll Stansbury
Glendon C. Brown
By Frank H. Hubbard
Attorney Patented Sept. 6, 1932

1,876,436

UNITED STATES PATENT OFFICE

CARROLL STANSBURY, OF WAUWATOSA, AND GLENDON C. BROWN, OF MILWAUKEE, WISCONSIN, ASSIGNORS TO CUTLER-HAMMER, INC., OF MILWAUKEE, WISCONSIN, A CORPORATION OF DELAWARE

PHASE FAILURE AND PHASE REVERSAL PROTECTIVE SYSTEM

Application filed February 28, 1930. Serial No. 432,278.

This invention relates to phase failure and phase reversal protective systems.

An object of the invention is to provide improved means responsive to departure from normal of an operating condition in a polyphase circuit, such as phase failure, phase reversal or unbalance of the voltages.

Other objects and advantages will hereinafter appear.

The accompanying drawings illustrate a number of systems embodying the invention.

Fig. 1 illustrates the use of a half wave electron tube in combination with certain other apparatus for obtaining phase failure and phase reversal protection on a three phase current system.

Figs. 2 to 7 inclusive are diagrams of the voltages obtaining in the system under different conditions of power supply.

Figure 8:
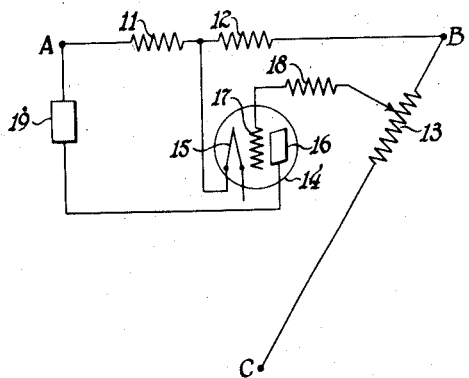
Fig. 8 shows a system similar to that illustrated in Fig. 1 except that the control voltage for the grid of the electron tube is obtained in a somewhat different manner.

Referring to Fig. 1 the same diagrammatically illustrates the invention as employed in connection with a three phase power supply system. A, B and C are the terminals of a power supply system in which the voltages between any two of the three lines are equal. A transformer having a primary winding 1 is connected between the lines A and B. The transformer has a voltage tap in the center of its primary winding and between such tap and the line C are connected non-inductive resistances 2 and 3 in series. An electron tube 4 of the gaseous type, having a cathode 5, an anode 6 and a grid 7 is connected in series with an electromagnetic relay 8 between the mid tap of the winding 1 and the line B. The transformer is also equipped with a secondary winding 9 which is connected between the point intermediate of the resistances 2 and 3 and the grid 7.

The apparatus functions in the following manner:

Assume that the voltages of the power supply system are balanced and that the normal phase rotation of the same is counter clockwise. By referring to Fig. 2 it will be apparent that the voltage between anode 6 and cathode 5 may be represented by the horizontal vector $Ep$, while the grid voltage $Eg$ is composed of two components, namely the voltage drop through the resistance 2, which may be represented by the vector $Er$ and the voltage induced in the secondary winding 9 which may be represented by the vector $Et$. As the voltages in the system are assumed to be rotating counterclockwise as indicated by the arrow, the instantaneous voltages of the tube may be represented as in Fig. 3 where $Ep$ is the instantaneous plate voltage and $Eg$ the instantaneous grid voltage. The dotted line $Ec$ shows the critical voltage which is just sufficient to prevent the current in the tube from starting, it being understood that once the current has started during the positive half cycle, it cannot be stopped by any change in the grid voltage. As the grid voltage which is represented by the curve $Eg$ is positive during the beginning of the half cycle when the plate voltage $Ep$ is also positive, current starts to flow just after the beginning of such half cycle, and any change in the instantaneous grid voltage will have no effect upon the functioning of the tube and hence upon the amount of energy going through the translating device 8. This translating device may be, for instance, a relay equipped with contacts for the control of other instrumentalities and the effective current which passes through the relay under normal conditions may be sufficient to cause it to close such contacts.

If now the phases A and B are reversed, the voltage relations are modified as illustrated in diagram Fig. 4. Fig. 5 shows the relation of the instantaneous grid and plate voltages, and it is apparent that the grid voltage is more negative than the critical voltage during the greater part of the half cycle when the plate voltage is positive, so that the tube becomes conducting only during the very last fraction of the positive half cycle or not at all, with the result that the effective current which passes through the relay 8 is reduced to a sufficiently small amount to cause it to open its contacts and thus cause the connected controlling instrumentalities to respond. The action of the apparatus in the case of reversal between phases A and C or B and C is similar to that aforedescribed.

Fig. 6 shows the relation of the voltages when a short circuit exists between the lines C and A while Fig. 7 shows the diagram in case of a short circuit between the lines C and B. In both cases the instantaneous grid voltage $Eg$ is at any moment more negative than the critical grid voltage during the positive half cycle of the plate voltage, and therefore the discharge between the main electrodes of the tube cannot start and the relay receives no current. It is further obvious that if either phase A or B should fail the voltage impressed upon the the tube 4 is practically zero and therefore relay 8 is sufficiently deenergized to drop its armature, while failure of phase C reduces $Er$ of Fig. 2 to zero and $Eg$ becomes identical with $Et$ so that the instantaneous anode and grid voltages are dephased 180° and the tube 4 remains non-conducting.

Figure 9:
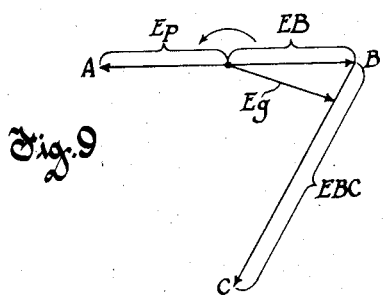
Fig. 9 illustrates diagrammatically the relation of the voltages supplied to the electron tube in Fig. 8 under normal conditions.

In Fig. 8 A, B and C again illustrate the terminals of a three phase balanced supply system, impedances 11 and 12 being connected in series between the lines A and B, while a third impedance 13 with an adjustable intermediate tap is connected between the lines B and C. An electron tube 14 having a cathode 15, an anode 16 and a grid 17 is connected to the system as follows: The cathode 15 is connected to the point intermediate of the resistances 11 and 12. The anode 16 is connected in series with the translating device 19 to line A, while the grid 17 is connected through the resistance 18 to the adjustable tap of the resistance 13. The resistances 11 and 12 are so designed that while the tube is conducting current the mid point between 11 and 12 has a potential which is intermediate of the potential between A and B, while the adjustable tap of the resistance 13 is so adjusted that the grid voltage $Eg$ has a certain phase relation to the plate voltage, as described in connection with Fig. 1. Fig. 9 shows diagrammatically the voltage relation under normal conditions. $Ep$ is again the plate voltage, EBC the voltage between B and C, while $Eg$ is the grid voltage.

It will be apparent that the phase relation between grid and plate voltage is the same as illustrated in Fig. 2 and the reversal of phases or a short circuit between certain lines cause similar variations in their phase relation so that the system functions in the same manner to affect the translating device 19 to respond to abnormal conditions.

Figure 10:
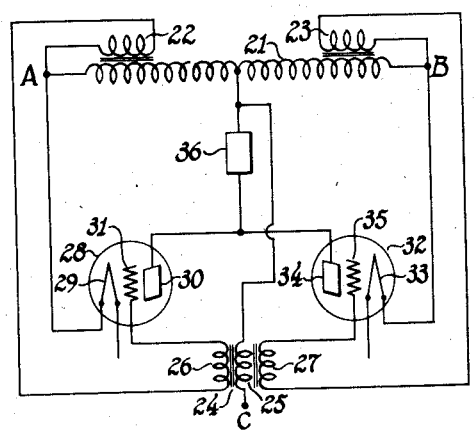
Fig. 10 shows another modification in which two half wave electron tubes are employed so as to get full wave rectification of the alternating current.

Fig. 10 shows the invention in connection with two half wave rectifiers which are connected so that a substantially constant continuous current passes through the translating device under normal conditions.

The lines A, B, C are again the terminals of a three phase supply system. A transformer has its primary winding 21 connected between lines A and B. The transformer is equipped with secondary windings 22 and 23. One end of each of these secondary windings is connected to the terminals A and B respectively.

A second transformer 24 having its primary winding 25 connected between the mid tap of the winding 21 and the line C, has secondary windings 26 and 27 which are respectively connected in series with the windings 22 and 23 aforedescribed. An electron tube 28 having a cathode 29, an anode 30 and a grid 31 is connected as follows: The cathode 29 is connected to the terminal A. The anode 30 is connected to one side of a translating device 36, the other side of which is connected to the mid-tap of the transformer winding 21. The grid 31 is connected to the free end of the secondary winding 26. A second electron tube 32 has its cathode 33 connected to the terminal B while its anode 34 is connected to the mid tap of the transformer 21 through the translating device and its grid 35 to the free end of the winding 27. It will be noted that the voltages impressed upon the plates 30 and 34 respectively are equal and opposite to each other, while the voltages impressed upon the grids 31 and 35 respectively are the resultants of two components, one of which is opposed to and the other at right angles to the plate voltage. The voltages are chosen so that the phase relation between plate and grid voltage of the respective tubes is under normal conditions as shown in Fig. 2. It will be obvious that under abnormal conditions such as described in connection with Figs. 4 to 7 inclusive the voltage relations will change in the same manner as previously described, and the tubes will become non-conducting or greatly reduce the currents which they carry. It will also be obvious that the two tubes conduct current alternately during successive half cycles of the alternating current impressed upon the circuit and therefore the current which passes through the translating device 36 is unidirectional and under given conditions of practically constant magnitude.

It will be obvious that besides those discussed other departures from normal conditions of the voltage relations in any of the systems shown, may cause a change in phase of the grid voltage with respect to the anode voltage and thus vary the energy supplied by the tube to the translating device to cause the latter to respond.

It is also obvious that while the invention is shown as applied to three phase systems, the same may be applied to the protection of any other system normally supplying two or more voltages which differ from each other in phase angle.

What we claim as new and desire to secure by Letters Patent is:

1. In combination, a polyphase circuit, a translating device, a continuously excited vapor electric device provided with a cathode and anode connected in series with said translating device to said circuit so as to receive space current therefrom, said vapor device being provided with an electrode arranged to control the current transmitted therethrough, said electrode being connected to the circuit so as to be normally subjected to a potential which lags a given angle behind the cathode potential, such lag being reduced by abnormal current and voltage conditions in the circuit.

2. In a polyphase system, two impedances connected in series between two phases of said system, a translating device, a continuously excited vapor electric device provided with a cathode and anode in series with said translating device, said series circuit being in parallel connection to one of said impedances, said vapor device being provided with an electrode arranged to control the current transmitted therethrough, said electrode being connected to the system through an impedance which subjects it to a potential which is caused to lag a given angle behind the anode potential under normal conditions of phase rotation, phase continuity and phase voltage, such lag being reduced upon departure of such conditions from normal.

3. In combination, a polyphase current supply system, a gaseous electron tube having an anode and a cathode connected to said system and also having a control electrode and means to subject said control electrode to a voltage of said system which lags a given angle with respect to the anode voltage under given voltage conditions in said system, for starting discharge of said tube at the beginning of the positive half cycle of impressed voltage, said means under other voltage conditions of said system reducing said lag for delaying starting of the discharge of said tube.

4. In combination, a polyphase circuit, a load circuit, a continuously excited vapor electric device provided with a cathode and anode connected between certain phases of said circuits and also provided with a control electrode and means subjecting said control electrode to a voltage which is derived from said polyphase circuit and which under normal voltage and phase conditions in the latter circuit lags a given angle behind the voltage impressed on said anode, said tube being thereby caused to discharge at the beginning of the positive half cycle of impressed voltage and said means being sensitive to abnormal voltage and/or phase conditions to reduce said lag.

In witness whereof, we have hereunto subscribed our names.

CARROLL STANSBURY.
GLENDON C. BROWN.